UNITED STATES PATENT OFFICE 2,288,929

PURIFICATION OF PENTAERYTHRITOLS

Joseph A. Wyler, Allentown, Pa., assignor to Trojan Powder Company, Allentown, Pa.

No Drawing. Application June 12, 1940,
Serial No. 340,090

3 Claims. (Cl. 260—615)

This invention relates in general to the purification of pentaerythritols. More particularly it relates to the separation of pentaerythritol and dipentaerythritol from the double compound of formula:

$(CH_2OH)_3 \cdot C \cdot CH_2 \cdot O \cdot CH_2 \cdot C(CH_2OH)_3 \cdot 4C(CH_2OH)_4$ It is well known that commercial pentaerythritol is essentially a mixture of pentaerythritol $[C(CH_2OH)_4]$ and dipentaerythritol $(CH_2OH)_3 \cdot C \cdot CH_2 \cdot O \cdot CH_2 \cdot C \cdot (CH_2OH)_3$ in varying proportions, but just how these pentaerythritols are united to each other is unknown. In previous applications, Serial Number 309,352, by Wyler and Wernett and Serial Number 326,380, now Patent No. 2,251,236, by Wyler and Wernett, the existence of the double compound consisting of one molecule of dipentaerythritol and four molecules of pentaerythritol is disclosed. This compound melts at 185–190° C., is stable in water solutions at temperatures as high as 106–108° C., is more soluble in water, especially at elevated temperatures than is either dipentaerythritol or pentaerythritol; and it crystallizes from water in the form of elongated, threadlike crystals. Pentaerythritol melts at 260.5° C. and usually crystallizes as octahedrons; dipentaerythritol melts at 221° C. and crystallizes as thin plates. Pentaerythritol and dipentaerythritol individually, are stable in water at temperatures as high as 150° C. and possibly higher.

I have discovered that the above mentioned double compound may be separated into pentaerythritol and dipentaerythritol by crystallization from water solution at temperatures above about 108° C. This may be effected by conducting the crystallization in a steam heated autoclave, provided with a stirrer, an exit valve for the steam formed by evaporation, and a suitable bottom for the prompt removal and filtration of the crystals in the hot condition.

The principles upon which my invention is based are as follows. The double compound of pentaerythritol and dipentaerythritol described above is stable in water solutions up to temperatures of about 106–108° C. At temperatures above this point the double compound separates into pentaerythritol and dipentaerythritol so that if the water which holds these materials in solution is evaporated at temperatures above this critical point, the pentaerythritol is the first material to crystallize out. Since the pentaerythritol content of the double compound is approximately 70% it will be clear that a large proportion of pentaerythritol can be separated before any dipentaerythritol precipitates. When the proper amount of water has been driven off, the mixture is filtered in the hot, preferably under pressure, as promptly as possible. This step is very important and must be carried out with a minimum drop in temperature and pressure so as to avoid contamination of the precipitated pentaerythritol by the double compound itself or by the dipentaerythritol which must remain in solution if the process is to operate satisfactorily. The crystals of pentaerythritol on the filter are rapidly washed, first with a strong, hot solution of pentaerythritol and then with hot water. The crystals may then be centrifuged to effect further removal of impurities.

In order more clearly to point out my invention, the following examples are given:

Examples 300 parts (by weight) of the double compound (melting point 184–190° C.) were dissolved in 500 parts (by weight) of boiling water contained in an autoclave. The temperature in the autoclave was raised to 140° C. and the steam which formed was allowed to blow off at this temperature for about 35 minutes. The pressure was then released as rapidly as possible and the mixture filtered and washed in the hot. 87 parts (by weight) of crystals remained on the filter. These had a melting point of 253.7–254.2 °C.

In a similar test, where the boiling was continued for 45 minutes at 143° C. a yield of 108 parts of a pentaerythritol of melting point 241–245° C. was obtained. In this test the temperature of the mixture had cooled to about 100° C., thus causing the separation of some double compound which contaminated the product.

In both of these tests the apparatus used was rather crude and consequently it was not possible to obtain as clear-cut a separation and washing of the crystals as was desirable. However, these tests show how the double compound can be broken up into a high quality pentaerythritol.

Although I prefer to use the procedure as outlined in the examples given above, I may simply mix the double compound or an impure pentaerythritol containing this double compound with an amount of water that is insufficient to dissolve the pentaerythritols, even at the high temperatures; stir the mixture at temperatures above about 108° C. for one hour or more; filter hot, wash and dry. This avoids the necessity of evaporating a large amount of water and has other advantages over the evaporation method.

Other tests, in which the effect of temperature was determined, showed that a temperature of about 106-108° C. at atmospheric pressure is the critical temperature below which the double compound is stable and above which it decomposes into pentaerythritol and dipentaerythritol.

The mother liquors left from each of the tests described above are placed into the heated autoclave and treated in the same manner as under the first test in order to obtain a further crop of crystals from each. This process is repeated as often as needed for each particular case. Melting point determinations on the crystals obtained inform the operator just when to cease making separations.

300 parts of the double compound in the first test, gave 87 parts of a pentaerythritol of 97% purity. Theoretically these 300 parts of the double compound contain 216 parts of 97% pentaerythritol. Therefore the first treatment gave a $$\frac{87}{216} \times 100 = 40\%$$

of theory yield.

In many cases it is not desirable to make a pentaerythritol of such a high degree of purity, consequently, in reworking the mother liquors, a product of 235-245° C. melting range is often made. This product contains pentaerythritol, the double compound mentioned above, and some free dipentaerythritol. The mother liquors finally obtained will be rich in dipentaerythritol and the latter may be separated, preferably by cooling the hot solutions to about 65-70° C., filtering, cooling the filtrate to below room temperature and collecting the crystals which have separated below 65-70° C. These crystals may then be further purified by dissolving in boiling water, followed by cooling. The dipentaerythritol thus obtained usually separates in the form of plate crystals melting at about 221° C.

Although the examples given point out certain operative details, I wish to emphasize that the latter are merely illustrative in nature and are not intended to limit me to these particular conditions. My discussion above of the principles underlying my process, gives a more definite idea of the scope of my invention. I do not limit myself in any way except as indicated by the appended claims.

It will also be apparent, from the examples, that my process is not merely a method for the purification and separation of pentaerythritol, but is also a method for obtaining dipentaerythritol in a purer condition. This represents a distinct advance, since so far as I am aware, the only publicly known methods for separating pentaerythritol and dipentaerythritol are based upon either the nitration of the mixture of these, followed by the fractional separation of the nitrates by means of acetone and water with the subsequent reduction of the dipentaerythritol hexanitrate to dipentaerythritol; or upon heating a mixture of pentaerythritol and dipentaerythritol formates in such a manner as to decompose one and not the other—either of which processes is uneconomical.

I claim:

1. The process for producing and purifying pentaerythritol contained in a mixture consisting essentially of pentaerythritol, the double compound

and dipentaerythritol, which comprises heating this mixture in aqueous medium at a temperature above about 108° C., evaporating a sufficient amount of water from this mixture above about 108° C. to effect the separation of pentaerythritol crystals and filtering off these crystals at a temperature approximating 108° C.

2. The process for producing and purifying pentaerythritol contained in a mixture consisting essentially of pentaerythritol, the double compound,

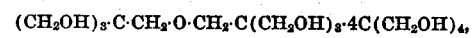

and dipentaerythritol, which comprises heating this mixture in aqueous medium at a temperature above about 108° C., evaporating a sufficient amount of water from this mixture above about 108° C. to effect the separation of pentaerythritol crystals, filtering off these crystals at a temperature of approximately 108° C., cooling the filtrate to from about 65° C. to about 70° C., and filtering off the crystals at about this temperature.

3. The process for producing and purifying pentaerythritol contained in a mixture consisting essentially of pentaerythritol, the double compound,

and dipentaerythritol, which comprises heating this mixture in aqueous medium at a temperature above about 108° C., evaporating a sufficient amount of water from this mixture above about 108° C. to effect the separation of pentaerythritol crystals above this temperature, cooling the mixture to from about 65° C. to about 70° C., filtering at about this temperature, cooling the filtrate and separating the crystals of dipentaerythritol which form.

JOSEPH A. WYLER.